(12) United States Patent
Banerjee et al.

(10) Patent No.: US 7,571,247 B2
(45) Date of Patent: Aug. 4, 2009

(54) EFFICIENT SEND SOCKET CALL HANDLING BY A TRANSPORT LAYER

(75) Inventors: Dwip N. Banerjee, Austin, TX (US); Vinit Jain, Austin, TX (US); Kavitha Ramalingam, Karnataka (IN); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 777 days.

(21) Appl. No.: 11/301,106

(22) Filed: Dec. 12, 2005

(65) Prior Publication Data

US 2007/0133582 A1    Jun. 14, 2007

(51) Int. Cl.
G06F 15/16 (2006.01)
(52) U.S. Cl. .............. 709/232; 709/226; 370/389; 370/465
(58) Field of Classification Search .......... 709/226, 709/232; 370/389, 465
See application file for complete search history.

(56) References Cited

U.S. PATENT DOCUMENTS

2003/0002508 A1  1/2003  Dierks, Jr. et al.
2005/0086359 A1  4/2005  Banerjee et al.
2005/0135352 A1* 6/2005  Roe et al. .......... 370/389

OTHER PUBLICATIONS

Performance Management Guide, International Business Machines Corporation, 31 pages, [online], [accessed on Oct. 1, 2005]. Retrieved from the internet <URL: http://publib16.boulder.ibm.com/pseries/en_US/aixbman/prftungd/netperf3.htm>.
Performance Management Guide, International Business Machines Corporation, 13 pages, [online], [accessed on Oct. 1, 2005]. Retrieved from the internet <URL: http://publib16.boulder.ibm.com/pseries/en_US/aixbman/prftunggd/netperf1.htm>.

* cited by examiner

Primary Examiner—David Lazaro
(74) Attorney, Agent, or Firm—Matthew W. Baca; Amy J. Pattillo (57) ABSTRACT

A method, system, and program provide for efficient send socket call handling by a transport layer. A transport layer of a network protocol stack receives a send socket call for data of a specified length from an application layer. Responsive to detecting that there is insufficient memory for a single memory allocation to a buffer in the transport layer for at least the specified length, the transport layer blocks the send socket call. The transport layer only wakes the send socket call upon detection of sufficient memory for the single memory allocation within the buffer of the transport layer for at least the specified length, wherein waking the send socket call triggers a kernel to perform the single memory allocation in the buffer and to write the data to the single memory allocation in a single pass.

17 Claims, 3 Drawing Sheets

EFFICIENT SEND SOCKET CALL HANDLING BY A TRANSPORT LAYER

BACKGROUND OF THE INVENTION

1. Technical Field

The present invention is directed to a method, system, and program for efficient send socket call handling by a transport layer, wherein the send socket call is blocked until sufficient memory is available for a single memory allocation within the socket buffer sufficient for an entire length of data in said send socket call.

2. Description of Related Art

The Internet has become a significant communication media in the modern world and is enabling the world to migrate to one global data communications system. In general, the Internet uses the Transmission Control Protocol/Internet Protocol (TCP/IP) suit of protocols to provide a common communication mechanism for computers, and other data transmission devices, to communicate with one another.

Communication with applications running on a server is typically performed using ports and addresses assigned to the application and the server apparatus. A port may be a physical port or a logical port. A physical port is a pathway into and out of a computer or a network device such as a switch or router. For example, the serial and parallel ports on a personal computer are external sockets for plugging in communication lines, modems, and printers. Every network adapter has a port (Ethernet, Token Ring, etc.) for connection to the local area network (LAN). Any device that transmits and receives data implies an available port to connect to each line.

A logical port is a number assigned to an application running on the server by which the application can be identified. While a server may have a single physical port, the server may use multiple logical ports. The combination, of a logical port identifier and the address of the server apparatus, is referred to as a socket.

The address of a server is a network address that identifies the server in the network and how to route data to a particular physical port of the server through the network. The address may take the form of a Uniform Resource Locator (URL), or in the case of the Internet, an Internet Protocol (IP) address such as 205.15.01.01, or the like. The address is included in headers of data packets transmitted by a device. The data packets are routed through the network from device to device by reading the header of the data packet and determining how to route the data packet to its intended destination based on the address.

The TCP/IP protocol provides various socket functions that may be used in the handing of data as the data is transported to and from the application through the socket. One such function that is used by an application for a write request is the send socket call. For example, an application invokes a send socket call and specifies the socket, buffer within the socket, length of the data to be sent, and set flags. The TCP layer of the TCP/IP protocol stack receives the send socket call and triggers the kernel to allocate available memory to a send buffer within the socket for writing the send socket call data. In particular, a pool of memory is available for allocation to sockets, where each allocation is termed an mbuf. In some cases, there is sufficient memory available to allocate a single mbuf that is large enough for the length of the send function data. However, If not all the data can be written to the first mbuf or if no memory is available for allocation of an mbuf when the send function is received, then the TCP blocks the send thread.

As the TCP layer receives acknowledgements (ACKs) that sent data packets are received by the receiver, the TCP layer calls the kernel to release the acknowledged data packets back into the pool of memory. In addition, for each ACK, the TCP wakes up the blocked send thread, which then triggers the kernel to attempt to allocate an mbuf from the recently released memory into the send buffer and to write the next portion of the data to the new mbuf.

In one example, a send socket call sets the length of the data to at 64 kilobytes. Each data packet sent by the TCP layer to the receiver is limited to a maximum segment size (MSS) of 1460 bytes and each ACK is 2 MSS, or 2920 bytes (4 kilobytes). When the TCP layer receives the send socket call, in the example, there is 4 k of memory available for allocation to the send buffer for the socket. The kernel allocates a 4 k mbuf to the send buffer and writes 4 k of the 64 k of data into the send buffer, leaving 60 k of data remaining to be written. The TCP layer then blocks the send thread until a next ACK is received. When the TCP layer receives the next ACK, the TCP layer triggers the kernel to release the mbuf holding the data associated with the ACK. Next, the TCP layer wakes up the send thread which triggers the kernel to attempt to allocate a new mbuf from the released memory and write another 4 k into the new mbuf. Thus, for a 64 k send socket call where the ACKs are slow to return, in the example, the TCP layer may block and wake up the send thread 16 or more times.

As indicated by the example, while the single send socket call for a large data write is efficient for an application sending the data, the single send socket call is not handled efficiently within the TCP/IP protocol stack when the data length is larger than the memory available for allocation. In particular, for the TCP layer to handle the send thread by blocking when no additional memory is available for allocation and then waking up the thread each time an ACK is received, significant CPU, bus and memory resources are inefficiently locked up and only a portion of the data is written for each wake up.

Further, as the TCP layer inefficiently triggers a separate mbuf allocation each time an ACK is received and memory is released, each mbuf is added to a chain. As the mbuf chain increases, locating an mbuf to release memory becomes more time consuming and thus inefficient. In addition, when the data for a single send socket call is written to multiple chained mbufs, to push the data to the network, the TCP layer must pass multiple pointers to the chained mbufs to a network layer and link layer. For the link layer, which includes the adapter hardware for actually placing the data packet onto the network, a direct memory access (DMA) is made to the data from the pointers passed down by the TCP layer and the data queued at the adapter level; it is inefficient, however, to perform a direct memory access (DMA) of the pointed to chained mbufs because the adapter only queues contiguous data and thus additional memory management is required to copy the chained mbufs into contiguous data.

Therefore, in view of the foregoing, it would be beneficial to enable a transport layer to respond to a send socket call such that when the memory pool does not include sufficient memory available for allocation to an mbuf large enough for the send socket call length, the transport layer blocks the send thread until sufficient memory is available for allocation of a single mbuf for writing the data in one pass for the send socket call.

SUMMARY OF THE INVENTION

Therefore, the present invention provides a method, system, and program for efficient handling of a send socket call received at a transport layer of a network protocol stack.

In one embodiment, a transport layer receives a send socket call for data of a specified length from an application layer. Responsive to detecting that there is insufficient memory for a single memory allocation to a buffer in the transport layer for at least the specified length, the transport layer blocks the send socket call. The transport layer only wakes the send socket call upon detection of sufficient memory for the single memory allocation within the buffer of the transport layer for at least the specified length, wherein waking the send socket call triggers a kernel to perform the single memory allocation in the buffer and to write the data to the single memory allocation in a single pass.

The application layer may set a flag within the send socket call requiring only the single memory allocation for the send socket call. The transport layer is enabled to detect the flag.

Responsive to blocking the send socket call, the transport layer may set a minimum memory allocation size to the specified length, wherein the transport layer automatically only wakes the send socket call upon detection of sufficient memory for the minimum memory allocation size. Alternatively, the transport layer may set a blocked thread size, independent of the minimum memory allocation size, to the specified length, wherein the transport layer automatically only wakes the send socket call upon detection of sufficient memory for the blocked thread size.

The memory available for allocation to the buffer is held in a memory pool designated for allocation among multiple buffers at the transport level. A single memory allocation from the memory pool to a buffer is an mbuf. A transport level may detect a maximum segment size receivable by a system receiving the data and set a maximum amount of memory allocable in total to the send socket buffer to an amount larger than the maximum segment size.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
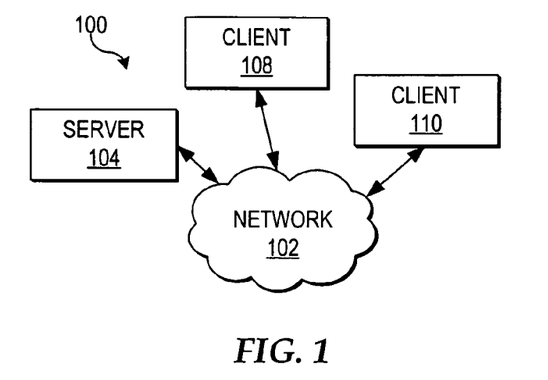
FIG. 1 is a pictorial representation depicting a network of computing systems in which the present invention may be implemented.

With reference now to the figures, FIG. 1 depicts a pictorial representation of a network of computing systems in which the present invention may be implemented. Distributed network 100 is a network of computers in which the present invention may be implemented. Distributed network 100 includes a network 102, which is the medium used to provide communication links between various devices and computers connected together within distributed network 100. Network 102 may include a single or multiple types of connections including, but not limited to, permanent connections such as wire or fiber optics cables, temporary connections made through telephone connections, and wireless transmission connections.

In the depicted example, server 104 is connected to network 102. In addition, clients 108, 110, and 112 are also connected to network 102. These clients 108, 110, and 112 and server 104 may be any of multiple types of computing systems. In other embodiments, additional or alternate clients and servers may be connected to network 102.

In addition, in the depicted example, server 104 provides data to clients 108, 110, and 112, where clients 108, 110, and 112 are clients of server 104 within a client/server environment. The terms "client" and "server" are used to refer to a computing system's general role as the receiver of data (client) or provider of data (server). Additionally, each of server 104 and clients 108, 110, and 112 may function as both a "client" and a "server" and may be implemented using a computing system such as computing system 200 of FIG. 2. Further, server 104 and clients 108, 110, and 112 may also engage in peer-to-peer network communications.

The client/server environment of distributed network 100 may be implemented within many different network architectures. In one example, distributed network 100 is the Internet with network 102 representing a worldwide collection of networks and gateways that use a packet-switching based suite of protocols to communicate with one another. One example of a packet-switching based suite of protocols is the Transport Control Protocol/Internet Protocol (TCP/IP) suite of protocols. Distributed network 100 may also be implemented within additional or other types of network architectures such as, for example, an intranet, a local area network (LAN), or a wide area network (WAN). In other embodiments, the network architecture and systems depicted in FIG. 1 may vary. Further, those of ordinary skill in the art will appreciate that the depicted example is not meant to imply architectural limitations with respect to the present invention.

In one example, server 104 may receive multiple communication requests to access the same application or resource from each of client system 108, 110, and 112 at the same time. Server 104 may service these multiple requests simultaneously by initially invoking multiple threads which wait to accept communication requests. Server 104 opens a new socket to process each request. As will be further described, as an application at server 104 receives the request and responds with send socket calls to send data, a transport layer within the packet switching protocol stack blocks each write thread and does not wake the write thread until a single buffer allocation is able to receive the entire data write within the socket buffer. By blocking a send thread until memory is available for a single buffer allocation large enough to receive the length of the send socket call in the socket buffer, server 104 responds more efficiently to send socket calls of a size that exceed the memory available for allocation within the socket buffer at the time of the request.

Figure 2:
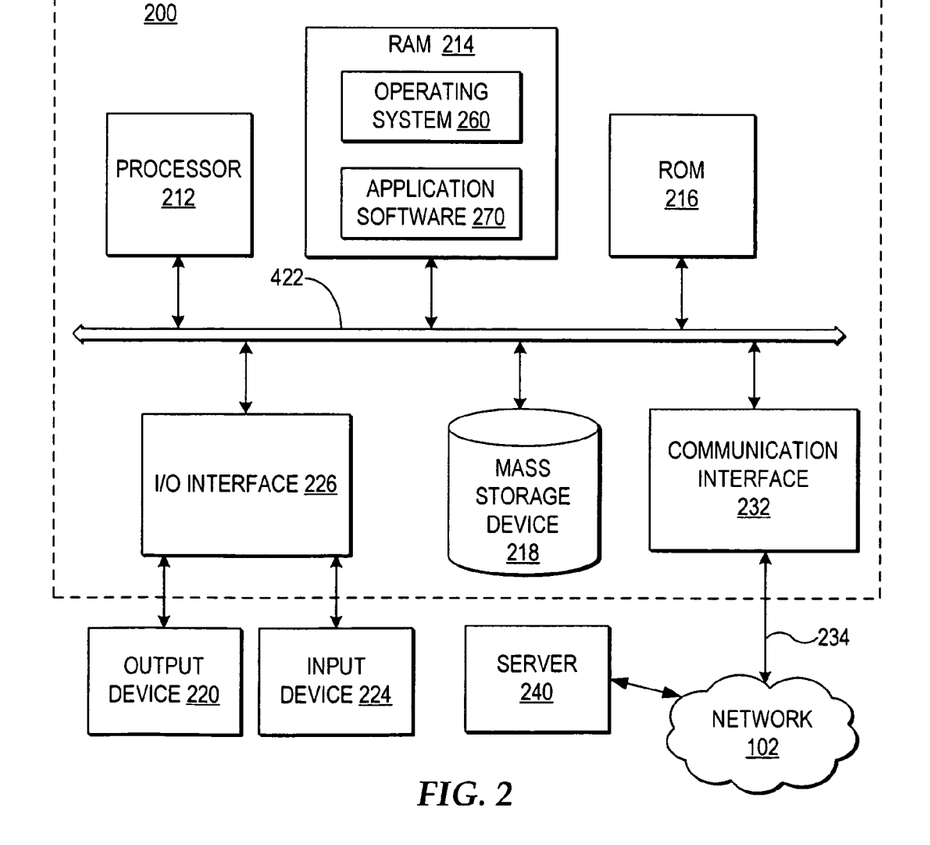
FIG. 2 is a block diagram depicting one embodiment of a computing system communicatively connected to a network in which the present invention may be implemented.

Referring now to FIG. 2, a block diagram depicts one embodiment of a computing system in which the present invention may be implemented. The present invention may be executed in a variety of systems, including a variety of computing systems communicatively connected to a packet switching network, such as network 102.

Computer system 200 includes a bus 222 or other communication device for communicating information within computer system 200, and at least one processing device such as processor 212, coupled to bus 222 for processing information. Bus 222 preferably includes low-latency and higher latency paths that are connected by bridges and adapters and controlled within computer system 200 by multiple bus controllers. When implemented as a server, computer system 200 may include multiple processors designed to improve network servicing power. Where multiple processors share bus 222, an additional controller (not depicted) for managing bus access and locks may be implemented.

Figure 4:
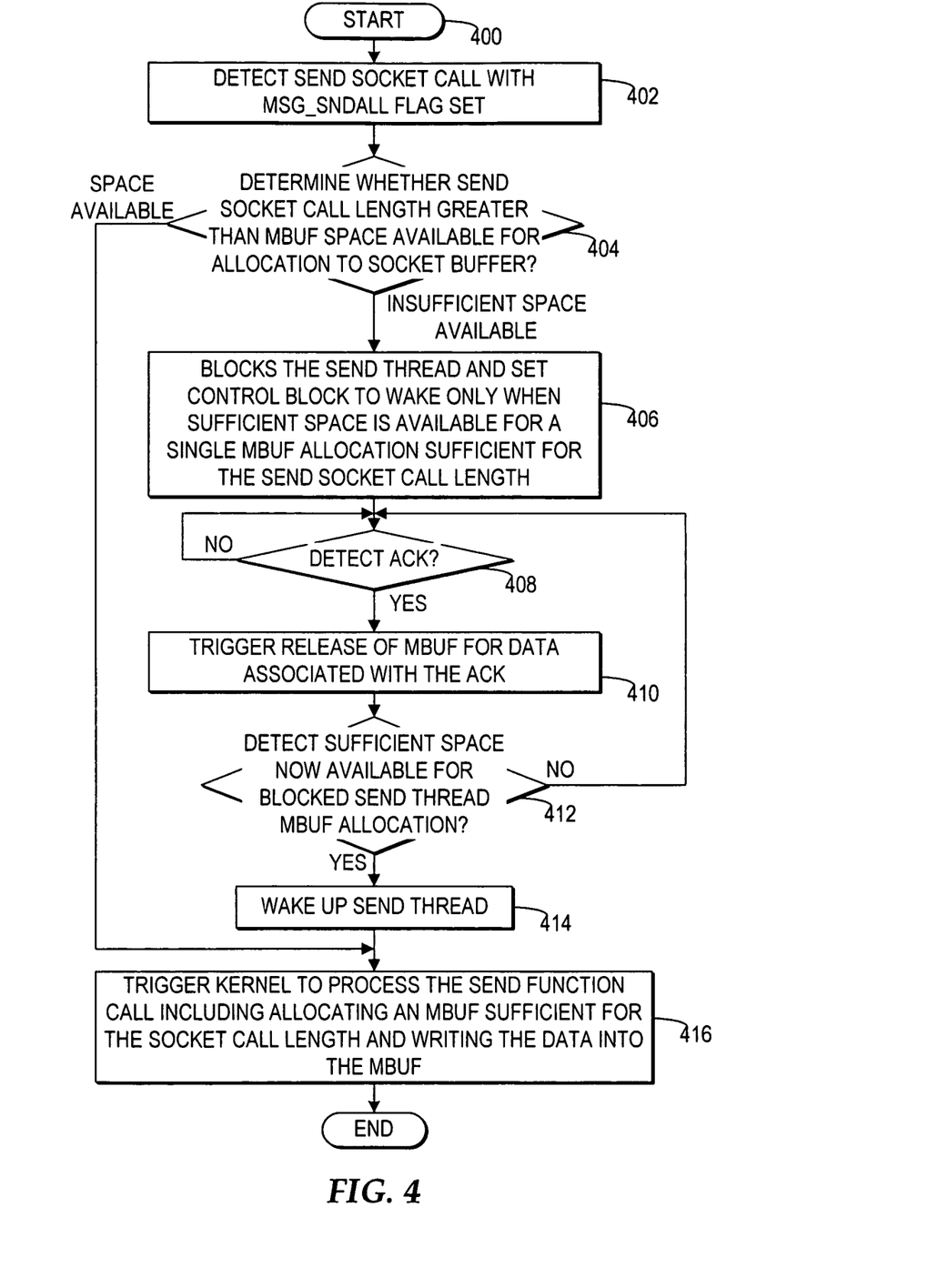
FIG. 4 is a high level logic flowchart depicting a process and program for efficiently handling a send socket call within a transport layer of a network protocol stack.

Processor 212 may be a general-purpose processor such as IBM's PowerPC™ processor that, during normal operation, processes data under the control of an operating system 260, application software 270, middleware (not depicted), and other code accessible from a dynamic storage device such as random access memory (RAM) 214, a static storage device such as Read Only Memory (ROM) 216, a data storage device, such as mass storage device 218, or other data storage medium. Operating system 260 may be referred to as a kernel. Additionally, multiple operating systems may run within computer system 200. In one embodiment, operating system 260 and middleware may control write request operations in communications between computer system 200 and at least one other computer system via network 102 as depicted in the flowcharts of FIG. 4 and other operations described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 200 to perform a process according to the present invention. The term "machine-readable medium" as used herein includes any medium that participates in providing instructions to processor 212 or other components of computer system 200 for execution. Such a medium may take many forms including but not limited to, storage media, such as non-volatile media and volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 400 can read and which is suitable for storing instructions. In the present embodiment, an example of a non-volatile medium is mass storage device 218 which as depicted is an internal component of computer system 200, but will be understood to also be provided by an external device. Volatile media include dynamic memory such as RAM 214. Transmission media include coaxial cables, copper wire or fiber optics, including the wires that comprise bus 222. Transmission media can also take the form of acoustic or light waves, such as those generated during radio frequency or infrared data communications.

Moreover, the present invention may be downloaded as a computer program product, wherein the program instructions may be transferred from a remote computer such as a server 240 to requesting computer system 200 by way of data signals embodied in a carrier wave or other propagation medium via network 102 to a network link 234 (e.g. a modem or network connection) to a communications interface 232 coupled to bus 222. Communications interface 232 provides a two-way data communications coupling to network link 234 that may be connected, for example, to a local area network (LAN), wide area network (WAN), or directly to an Internet Service Provider (ISP). In particular, network link 234 may provide wired and/or wireless network communications to one or more networks, such as network 102. Further, although not depicted, communication interface 232 may include software, such as device drivers, hardware, such as adapters, and other controllers that enable communication. When implemented as a server, computer system 100 may include multiple communication interfaces accessible via multiple peripheral component interconnect (PCI) bus bridges connected to an input/output controller, for example. In this manner, computer system 200 allows connections to multiple clients via multiple separate ports and each port may also support multiple connections to multiple clients.

Network link 234 and network 102 both use electrical, electromagnetic, or optical signals that carry digital data streams. The signals through the various networks and the signals on network link 234 and through communication interface 232, which carry the digital data to and from computer system 200, may be forms of carrier waves transporting the information.

In addition, computer system 200 may include multiple peripheral components that facilitate input and output. These peripheral components are connected to multiple controllers, adapters, and expansion slots, such as input/output (I/O) interface 226, coupled to one of the multiple levels of bus 222. For example, input device 224 may include, for example, a microphone, a keyboard, a mouse, or other input peripheral device, communicatively enabled on bus 222 via I/O interface 226 controlling inputs. In addition, for example, a display device 220 communicatively enabled on bus 222 via I/O interface 226 for controlling outputs may include, for example, one or more graphical display devices, but may also include other output interfaces, such as an audio output interface. In alternate embodiments of the present invention, additional or alternate input and output peripheral components may be added.

Those of ordinary skill in the art will appreciate that the hardware depicted in FIG. 2 may vary. Furthermore, those of ordinary skill in the art will appreciate that the depicted example is not meant to imply architectural limitations with respect to the present invention.

Figure 3:
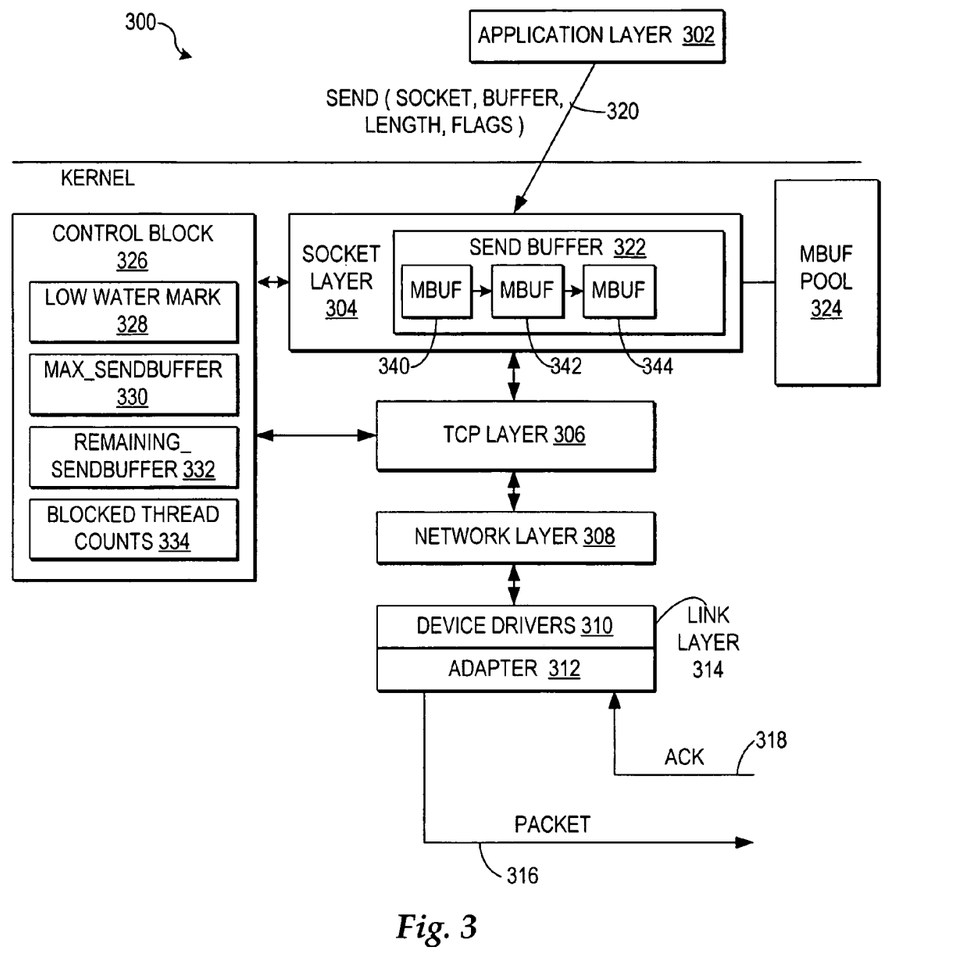
FIG. 3 is a pictorial representation depicting a transport layer for efficient send socket call handling within a network protocol stack.

With reference now to FIG. 3, a pictorial diagram illustrates one embodiment of a transport layer for efficient send socket call handling within a network protocol stack. In the example, the interaction of the elements of the TCP/IP protocol stack 300 is illustrated with reference to a send call. In the example, the layers of protocol stack 300 include an application layer 302, a socket layer 304, a TCP layer 306, a network layer 308, and a link layer 314. Socket layer 304 and TCP layer 306 are depicted separately, but may be considered part of a transport layer. It will be understood that other protocols stacks that enable packet switching communications may implement the present invention and that additional or alternate layers may be implemented protocol stack 300.

In the example, application layer 302 passes a send socket call in the form of a send( ) command to a socket layer 304. In the example, as illustrated at reference numeral 320, the send( ) command may include multiple parameters including, but not limited to, a socket identifier, a buffer identifier, a length of the data, and flags. In one implementation of the invention, the flags parameter may include a setting to write all the data for the send socket call at one time. For example, when a flag named MSG_SNDALL is set in a send( ) command, the data for the send socket call is only to be written into a send buffer 322 within socket layer 304 for transport via network 102 to a receiver when sufficient space is available to write all of the data into send buffer 322 at one time. Application layer 302 may include multiple types of applications, such as network applications, and application-layer protocols, such as the HTTP protocol, SMTP, FTP, and domain name system (DNS).

In addition, in the example, for the data in a send socket call to be written into send buffer 322 at one time, the kernel must allocate a single mbuf sufficient to hold the length of the data in the send socket call. In the embodiment, mbufs, such as mbufs 340, 342, and 344 are blocks of memory each separately allocated by the kernel from an mbuf pool 324 to send buffer 322. In the example, the kernel adds each allocated mbuf to a chain of mbufs each pointed to by a separate pointer, such as chained mbufs 340, 342, and 344. It will be understood that a kernel may implement other memory allocation management structures in addition to or as an alternative to chaining. In addition, it will be understood that while the embodiment is described with respect to a kernel controlling the allocation of memory from mbuf pool 324 to send buffer 322, an allocation resource separate from the kernel may also control memory allocations.

In particular, mbuf pool 324 refers to the memory set aside for allocation to buffers within socket layer 304. In addition to send buffer 322, socket layer 304 may include additional send buffers, receive buffers, and other types of buffers for holding data. Further, socket layer 304 may include multiple open sockets. It will be understood that multiple mbuf pools may be available, that an mbuf pool may be shared across multiple separate socket layers and that other memory allocation configurations may be implemented.

A control block 326 may include settings for limiting allocation of memory from mbuf pool 324 to buffers within socket layer 304. For example, a max_sendbuffer 330 indicates a maximum total amount of memory that the kernel can allocate from mbuf pool 324 to send buffer 322 at one time. In another example, in some protocol stacks, such as Berkeley Software Distribution (BSD) or BSD derived protocol stacks, a low water mark 328 sets a minimum amount of memory for the kernel to allocate for each mbuf within send buffer 322. It will be understood that additional or alternate settings within control block 326 may limit and tune the allocation of memory from mbuf pool 324. Further, while the embodiment is described with reference to control block 326 accessible to socket layer 304 and TCP layer 306, in other embodiments each layer may access a separate control block or only particular settings within control block 326.

Returning to the example, each send socket call received at socket layer 304 is passed to TCP layer 306. In general, TCP layer 306 transports messages from application layer 302 to a client system and transports messages received from a client system to application layer 302. In particular, TCP layer 306 transports data from send buffer 322 to a client system.

In one embodiment, a counter remaining_sendbuffer 332 indicates the current amount of memory released to mbuf pool 324 that can be allocated to send buffer 322. In other embodiments, other counters may indicate the memory available for allocation to an mbuf or a call to the kernel may be required to access the amount of memory available for allocation to an mbuf.

Upon receipt of a send socket call at TCP layer 306 with the MSG_SNDALL flag set, in the example, TCP layer 306 checks a counter remaining_sendbuffer 332 to detect whether there is sufficient space available in mbuf pool 324 for allocation of an mbuf large enough for the length of data in the send socket call. If sufficient space is available, then TCP layer 306 triggers the kernel to allocate an mbuf block for the send socket call within send buffer 322 and to write the data into the mbuf within send buffer 322.

For data written into an mbuf block of send buffer 322, TCP layer 306 controls transport of the data to the network in packets, as illustrated at reference numeral 418. First, TCP layer 306 passes the data in packet sized segments to a network layer 308. A network layer 308 controls delivery of the packets along a network link through link layer 314, as illustrated at reference numeral 316, to a receiving system, such as one of clients 108, 110, or 112 illustrated in FIG. 1. Although not depicted, network layer 308 may run the IP protocol. A link layer 314 may include device drivers 310 that control adapters 312. Adapters 312 may include, for example, network interface cards.

A receiving system, responsive to receiving packets from the sending system, returns acknowledgements (ACKs), as illustrated at reference numeral 318. ACKs, such as ACK 318, are pushed up to TCP layer 306. TCP layer 306 receives each ACK and calls the kernel to release the associated mbuf from send buffer 322. As memory is released for each ACK, TCP layer 306 may adjust the count in remaining_sendbuffer 332 to indicate the adjustment.

Alternatively, when TCP layer 306 receives a send socket call with a MSG_SNDALL flag set and TCP layer 306 determines that sufficient space is not available for allocation of a single mbuf large enough for the send socket call length, then TCP layer 306 blocks the send thread and sets a setting within blocked thread counts 334 not to wake up the send thread until sufficient space is available in mbuf pool 324 for allocation of a single mbuf for the send socket call length. For each ACK received, TCP layer 306 detects from remaining_sendbuffer 332 whether sufficient space is available for allocating a single mbuf for the send socket call length.

In one example, if the send socket call is a length of 64 kilobytes (k) and mbuf pool 324 only includes 4 k available for allocation to send buffer 322 as indicated in remaining-_sendbuffer 332, then TCP layer 306 blocks the send thread and sets a threshold in blocked thread counts 334 of 64 k so that until sufficient ACKs are received that increase remaining_sendbuffer 332 to the threshold in blocked thread counts 334, TCP layer 306 does not wake the blocked send thread. When the TCP layer 306 detects remaining_sendbuffer 332 reach a count matching the threshold in blocked thread counts 324, then TCP layer 306 wakes the send thread, which triggers the kernel to allocate an mbuf of at least 64 k and write the 64 k of data into the mbuf.

In one embodiment, as an alternative to setting blocked thread counts 334, socket layer 304 may set low water mark 330 to the send socket call length, where low water mark 330 specifies the minimum mbuf allocation size and TCP layer 306 is set not to wake the send thread until the minimum mbuf allocation size is available. Following the previous example, responsive to receiving the send socket call with a length of 64 k, socket layer 304 would set low water mark 330 to 64 k. Thus, where a protocol stack already blocks the send thread based on low water mark 330, including a flag in the send socket call and directing socket layer 304 to update low water mark 330 to the send socket call length, enables the present invention without adding additional settings or counters to control block 326. In other embodiments, control block 326 may include additional or alternate settings and counters, application layer 302 may set alternate flags or send other commands, and socket layer 304 or TCP layer 306 may access the additional settings and counters and respond to the alternate flags or commands to control writing a data message into a contiguous data space for transport within a packet-switching protocol stack.

According to one advantage, by controlling a send socket call by only waking up a send thread when the kernel can allocate a single mbuf of at least the send socket call length, TCP layer 306 no longer inefficiently wakes up the send thread each time an ACK is received. In particular, waking the send thread only one time for a large send socket calls reduces the number of times that additional operations associated with waking a send socket call are performed. Although not depicted, TCP layer 306 wakes up a blocked send socket call by calling the kernel to perform the wake up. Next, the kernel determines if the CPU is available. Once the CPU is available, the kernel places a lock on the CPU and waits for the socket to become available. In particular, incoming ACKs may have priority over writes to socket layer 304, triggering socket lock contentions between the different ACKS attempting to secure the socket lock and causing significant delay before the socket is available for a send socket call. Once the socket becomes available, then the kernel acquires a socket lock for the send socket call. Next, the kernel determines what space is available for an mbuf allocation and controls an mbuf allocation from mbuf pool 224 to send buffer 322 with the space available. Finally, the kernel writes the data for the send thread into the allocated mbuf. Therefore, in view of the additional operations required to actually perform a send socket call operation only performing each of these operations once, rather than each time an ACK is received, allows more efficient use of kernel, bus, and CPU resources and reduces the socket lock contentions.

According to another advantage, by controlling a send socket call by only waking up a send thread when the kernel can allocate a single mbuf of at least the send socket call length and write the data in one pass, the kernel is no longer inefficiently triggered to allocate a separate mbuf each time TCP layer 306 receives an ACK. Only allocating a single mbuf for each send socket call reduces operations required as TCP layer 306 pushes the data for the send socket call to the network and reduces operations required as TCP layer 306 receives ACKs for the data.

In the first example, allocating a single mbuf for each send socket call reduces operations required as TCP layer 306 pushes the data to the network. Returning to the limitations of TCP performance when the MSG_SNDALL flag is not set, the TCP layer 306 wakes the send thread at each ACK and as a result multiple mbufs are allocated and multiple data writes performed for a single send socket call. The multiple mbufs are chained and each referenced by a pointer. When there are multiple pointers to multiple mbufs for a single send socket call, TCP layer 306 must pass all the pointers to network layer 308 and link layer 314, requiring additional resources. Further, for link layer 314 to queue the send socket call data from multiple mbufs, additional memory management operations must be performed with the DMA operations to transition the multiple mbufs into the contiguous data requirement of link layer 314. In contrast, when the MSG_SNDALL flag is set, TCP layer 306 only wakes the send thread when sufficient space is available for allocation of a single mbuf of at least the send socket call length and therefore there is only one pointer for the send socket call passed to network layer 308 and link layer 314. In addition link layer 314 can queue the single mbuf of contiguous data without performing additional memory management operations, allowing for more efficient DMA operations when queuing data for output through adapter 312.

In addition, only allocating a single mbuf for each send socket call enables TCP layer 306 to more efficiently take advantage of services such as TCP segmentation offload. In one example, adapter 312 may provide a TCP segmentation offload option that allows TCP layer 306 to offload the segmentation of data to adapter 312. TCP layer 306 normally performs segmentation of data into segments that are limited by the MSS. In one example, the MSS is set by TCP layer 306 determining the length of the largest frame that both link layer 314 can send and that the receiver can receive, also called the maximum transmission unit (MTU), and then setting the MSS to ensure that the TCP segment and IP data added by network layer 308 will fit in the single frame. For TCP segmentation offload, TCP layer 306 pushes the data from a single mbuf block to adapter 312 to offload the segmenting process to adapter 312. An ACK typically acknowledges two (2) packets, or 2 MSS. Thus, when TCP layer 306 calls the kernel to free memory, the memory associated with the 2 MSS in the ACK is released. By setting the MSG_SNDALL flag for send socket calls, for a write larger than 2 MSS, TCP layer 306 need only pass the pointer for one mbuf to link layer 314 in the TCP segmentation offload request.

In a second example, allocating a single mbuf for each send socket call reduces operations required as TCP layer 306 receives ACKs. If MSG_SNDALL is not set then likely each mbuf would be set to the same size as the data associated with each ACK and multiple mbufs may be allocated for a single send socket call. As each ACK is received, TCP layer 306 would trigger a freeing of the associated data and mbuf. However, where multiple smaller mbufs are chained for a single send socket call, the kernel must first traverse the chain to locate the associated mbuf and then perform operations that consume CPU and socket resources to release each mbuf back to mbuf pool 324. In contrast, where MSG_SNDALL is set, then for send socket call lengths greater than the ACK size, the associated mbuf would be larger than the ACK size. As TCP layer 306 receives an ACK for data associated with a send socket call with MSG_SNDALL set, only one mbuf would be associated with the send socket call, removing the step of identifying which mbuf for a send socket call is associated with the ACK. Further, as TCP layer 306 receives an ACK for data associated with a send socket call with MSG_SNDALL set, a pointer within the mbuf is moved for each ACK, requiring minimal kernel resources, until the end of the mbuf is reached and a single mbuf release operation is required for the send socket call.

In view of the described advantages, it is important to note that max_sendbuffer 330 may be set to further increase efficiency where an application is enabled to set the MSG_SNDALL flag. In particular, max_sendbuffer 330 may be set to an amount two or three times the receiver's window, which may be two or three times the MSS, so that TCP layer 306 is not starved of data to send while socket layer 304 waits for space to become available to copy the data.

Another function of TCP layer 306 is detecting when packets have been dropped and retransmitting the dropped packets. In one example, TCP layer 306 may implement a "fast retransmit" function. Under the "fast retransmit" function, TCP layer 306 continues sending packets even after a dropped packet. In particular, TCP layer 306 detects when the number of duplicate acknowledgements reaches a fast retransmit threshold, such as three duplicate acknowledgements. When the threshold is reached then TCP layer 306 infers the packet indicated in the duplicate acknowledgements has been dropped and automatically retransmits the dropped packet. Setting max_sendbuffer 330 to a size two or three times the MSS is also important in view of the "fast retransmit" function so that there is sufficient space to hold additional packets for TCP layer 306 to continue to send even after the dropped packet.

Referring now to FIG. 4, a high level logic flowchart illustrates a process and program for efficiently handling a send socket call within a transport layer of a network protocol stack. As illustrated the process starts at block 400 and thereafter proceeds to block 402. Block 402 depicts the transport layer detecting a send socket call with a MSG_SNDALL flag set, and the process passes to block 404.

Block 404 illustrates a determination whether the send socket call length is greater than the mbuf space available for allocation from the mbuf pool to the socket buffer. If there is sufficient space available, then the process passes to block 416. Block 416 depicts triggering the kernel to process the send function call which includes allocating an mbuf sufficient for the socket call length and writing the data into the mbuf, and the process ends.

Returning to block 404, if there is not sufficient space available, then the process passes to block 406. Block 406 depicts blocking the send thread and setting the control block to wake the send thread only when sufficient space is available for a single mbuf allocation sufficient for the send socket call length. Next, block 408 depicts a determination whether an ACK is detected at the transport layer. When an ACK is detected, the process passes to block 410. Block 410 illustrates triggering the kernel to release the mbuf for the data associated with the ACK, and the process passes to block 412.

Block 412 depicts a determination whether the transport layer now detects sufficient space available for the blocked send mbuf allocation. If sufficient space is still not available, then the process returns to block 408. If sufficient space is available, then the process passes to block 414. Block 414 illustrates waking up the send thread, and the process passes to block 416 and proceeds as previously described.

While the invention has been particularly shown and described with reference to a preferred embodiment, it will be understood by those skilled in the art that various changes in form and detail may be made therein without departing from the spirit and scope of the invention.

What is claimed is:

1. A method for efficient handling of a send socket call received at a transport layer of a network protocol stack of a computer system, comprising:
    responsive to receiving said send socket call for data of a specified length at said transport layer and detecting insufficient memory for a single memory allocation to a buffer in said transport layer for at least said specified length, blocking said send socket call at said transport layer;
    only waking said send socket call upon detection of sufficient memory for said single memory allocation of at least said specified length within said buffer in said transport layer, wherein waking said send socket call triggers a kernel to perform said single memory allocation of said at least said specified length in said buffer and to write said data to said single memory allocation in a single pass; and
    receiving said send socket call at said transport layer with a flag set requiring only said single memory allocation in said buffer for said send socket call.

2. The method according to claim 1, further comprising:
    responsive to blocking said send socket call, setting a minimum memory allocation size to said specified length, wherein said transport layer automatically only wakes said send socket call upon detection of sufficient memory for said minimum memory allocation size.

3. The method according to claim 1, further comprising:
    responsive to blocking said send socket call, setting a blocked thread size to said specified length, wherein said transport layer automatically only wakes said send socket call upon detection of sufficient memory for said blocked thread size, wherein said blocked thread size is independent of a setting specifying a minimum memory allocation size within said buffer.

4. The method according to claim 1, further comprising:
    responsive to detecting, at said transport level, an acknowledgment of received data, adjusting a counter indicating an amount of available memory for allocation to said buffer by an amount indicated in said acknowledgment.

5. The method according to claim 1, wherein said memory for allocation to said buffer is held in a memory pool designated for allocation among a plurality of buffers at said transport level.

6. The method according to claim 1, wherein said single memory allocation is an mbuf.

7. The method according to claim 1, further comprising:
    detecting a maximum segment size receivable by a system receiving said data; and
    setting a maximum amount of memory allocable at one time to said buffer to an amount larger than said maximum segment size.

8. A system for efficient handling of a send socket call, comprising:
    a computer system enabled for communication over a network by a network protocol stack comprising at least a transport layer for receiving said send socket call;
    said transport layer comprising means for blocking said send socket call, responsive to receiving said send socket call for data of a specified length and detecting insufficient memory for a single memory allocation to a buffer in said transport layer for at least said specified length;
    said transport layer comprising means for only waking said send socket call upon detection of sufficient memory for said single memory allocation of at least said specified length within said buffer in said transport layer, wherein waking said send socket call triggers a kernel to perform said single memory allocation of said at least said specified length in said buffer and to write said data to said single memory allocation in a single pass; and
    said transport layer comprising means for receiving said send socket call with a flag set requiring only said single memory allocation in said buffer for said send socket call.

9. The system according to claim 8, said transport layer further comprising:
    means, responsive to blocking said send socket call, for setting a minimum memory allocation size to said specified length, wherein said transport layer automatically only wakes said send socket call upon detection of sufficient memory for said minimum memory allocation size.

10. The system according to claim 8, said transport layer further comprising:
    means, responsive to blocking said send socket call, for setting a blocked thread size to said specified length, wherein said transport layer automatically only wakes said send socket call upon detection of sufficient memory for said blocked thread size, wherein said blocked thread size is independent of a setting specifying a minimum memory allocation size within said buffer.

11. The system according to claim 8, said transport layer further comprising:
    means, responsive to detecting an acknowledgment of received data, for adjusting a counter indicating an amount of available memory for allocation to said buffer by an amount indicated in said acknowledgment.

12. The system according to claim 8, wherein said memory for allocation to said buffer is held in a memory pool designated for allocation among a plurality of buffers at said transport level.

13. The system according to claim 8, wherein said single memory allocation is an mbuf.

14. The system according to claim 8, said transport layer further comprising:
   means for detecting a maximum segment size receivable by a system receiving said data; and
   means for setting a maximum amount of memory allocable at one time to said buffer to an amount larger than said maximum segment size.

15. A program for efficient handling of a send socket call received at a transport layer of a network protocol stack, said program embodied in a computer-readable storage medium, said program comprising computer-executable instructions which cause a computer to perform the steps of:
   controlling blocking of said send socket call, responsive to receiving said send socket call for data of a specified length and detecting insufficient memory for a single memory allocation to a buffer for at least said specified length;
   controlling waking of said send socket call only upon detection of sufficient memory for said single memory allocation of at least specified length within said buffer, wherein waking said send socket call triggers a kernel to perform said single memory allocation of said at least said specified length in said buffer and to write said data to said single memory allocation in a single pass; and
   enabling receipt of said send socket call at said transport layer with a flag set requiring only said single memory allocation in said buffer for said send socket call.

16. The program according to claim 15, further comprising:
   setting a minimum memory allocation size to said specified length, responsive to controlling blocking of said send socket call, wherein said transport layer automatically only wakes said send socket call upon detection of sufficient memory for said minimum memory allocation size.

17. The program according to claim 15, further comprising:
   setting a blocked thread size to said specified length, responsive to blocking said send socket call, wherein said transport layer automatically only wakes said send socket call upon detection of sufficient memory for said blocked thread size, wherein said blocked thread size is independent of a setting specifying a minimum memory allocation size within said buffer.

\* \* \* \* \*